United States Patent
Hasegawa

(10) Patent No.: US 6,513,609 B2
(45) Date of Patent: Feb. 4, 2003

(54) TRANSMISSION UNIT FOR HYBRID VEHICLE

(75) Inventor: Sachiyo Hasegawa, Kanagawa (JP)

(73) Assignee: Jatco Transtechnology Ltd., Fuji (JP)

( * ) Notice: Subject to any disclaimer, the term of this patent is extended or adjusted under 35 U.S.C. 154(b) by 164 days.

(21) Appl. No.: 09/785,455

(22) Filed: Feb. 20, 2001

(65) Prior Publication Data

US 2001/0023790 A1 Sep. 27, 2001

(30) Foreign Application Priority Data

Mar. 22, 2000 (JP) .................................. 2000-079548

(51) Int. Cl.[7] .............................. B60K 6/02; F16H 57/04
(52) U.S. Cl. .................... 180/65.6; 180/65.7; 74/606 R
(58) Field of Search ............................... 180/65.6, 337, 180/339, 344, 65.7; 74/665 F, 665 G, 665 GE, 665 T, 606 R; 475/5

(56) References Cited

U.S. PATENT DOCUMENTS

| | | | | |
|---|---|---|---|---|
| 4,468,979 A | * | 9/1984 | Inagaki et al. ............ 74/606 R |
| 4,950,213 A | * | 8/1990 | Morisawa ................... 184/6.12 |
| 5,440,951 A | * | 8/1995 | Okada et al. ............... 475/159 |
| 5,901,606 A | * | 5/1999 | Umemoto et al. ......... 74/15.66 |
| 6,109,393 A | * | 8/2000 | Toyota et al. .............. 184/11.2 |
| 6,174,260 B1 | * | 1/2001 | Tsukada et al. ............. 475/193 |
| 6,189,412 B1 | * | 2/2001 | Tsubata et al. ............... 474/43 |
| 6,233,931 B1 | * | 5/2001 | Matsufuji ..................... 60/487 |
| 6,397,968 B2 | * | 6/2002 | Sugano et al. .............. 180/339 |

FOREIGN PATENT DOCUMENTS

JP 2-62157 5/1990

OTHER PUBLICATIONS

U.S. patent application Ser. No. 09/785,454, Sugano, filed Feb. 20, 2001.
U.S. patent application Ser. No. 09/785,483, Sugano, filed Feb. 20, 2001.
U.S. patent application Ser. No. 09/785,484, Sugano, filed Feb. 20, 2001.
U.S. patent application Ser. No. 09/785,485, Sugano, filed Feb. 20, 2001.

* cited by examiner

Primary Examiner—Brian L. Johnson
Assistant Examiner—Bridget Avery
(74) Attorney, Agent, or Firm—Foley & Lardner

(57) ABSTRACT

A unit housing of a transmission unit for a hybrid vehicle is constituted by a first housing (42), a second housing (42), and a third housing (49). The first housing is provided with a first partitioning wall (46) and a third partitioning wall (70). The second housing is provided with a second partitioning wall (45) and a fourth partitioning wall (71). A first seal flange surface (72) formed on an end surface of the third partitioning wall (70) is on the same plane as an end surface of the first housing. A second seal flange surface formed on the end surface of the fourth partitioning wall is on the same plane as an end surface of the second housing. The first housing (42) and the second housing (41) are joined together by the first and second seal flange surfaces. A seal characteristic of each dry chamber against wet chambers can be assured in the unit housing with a wide space assured.

5 Claims, 4 Drawing Sheets

TRANSMISSION UNIT FOR HYBRID VEHICLE

BACKGROUND OF THE INVENTION:

1. Field of the Invention:

The present invention relates to a transmission unit for a hybrid vehicle. The hybrid vehicle is provided with an internal combustion engine and a motor/generator (a motor that functions as a generator), an output torque of these drive sources being transmitted to a variable gear shift unit to achieve a vehicular run driving force by either or both of the engine and the motor.

2. Description of the Related Art:

A Japanese Utility Model Registration Application Publication No. Heisei 2-62157 published on May 9, 1990 exemplifies a previously proposed housing structure of a transmission unit for a hybrid vehicle.

The previously proposed housing structure includes a first casing and a second casing, mutually facing surfaces of these first and second casings being joined in a flange structure. The mutually facing surfaces are only in outer peripheries of the first and second casings.

SUMMARY OF THE INVENTION

However, in a case where the transmission unit of the hybrid vehicle in which the motor (motor/generator) is incorporated, a motor chamber needs to be installed within the above-described joined casing of the transmission unit.

In this case, it is necessary to keep the motor chamber dry (under a state wherein oil is not lubricated).

It becomes difficult to maintain a seal characteristic against a wet chamber in which a transmission is housed. In addition, if a motor housing were additionally installed into the transmission unit housing so that the motor chamber can be defined as the dry chamber, this would introduce an increase in the number of parts.

It is therefore an object of the present invention to provide an improved housing of a transmission unit for a hybrid vehicle with a dry chamber having a high sealing ability and in which a motor (a motor/generator) is housed without introduction of the number of parts.

The above-described object can be achieved by providing a hybrid vehicle comprising: an engine (2); a clutch (11); a motor (15); a transmission (13) comprising an input axle that is disengageably engaged to the engine by the clutch and on which the engine, the clutch, and the motor are serially arranged and an output axle which is arranged in parallel to at least the motor; and a unit housing of the transmission comprising at least a first housing (42) and a second housing (41), the first housing comprising: a first partitioning wall (46) elongated in a radial direction of the transmission to define a first dry chamber and a second dry chamber, both of the first and second chambers inhibiting an entrance of a lubricating oil; and a third partitioning wall (70) elongated in an axial direction of the transmission to define the first and second dry chambers together with the first partitioning wall and to define a second wet chamber allowing the entrance of the lubricating oil, the second housing comprising: a second partitioning wall (45) elongated in the radial direction thereof to define a first wet chamber allowing the entrance of the lubricating oil; and a fourth partitioning wall elongated in the axial direction to define the second dry chamber and the second wet chamber together with the second partitioning wall, a first seal flange surface being formed on an end surface (72) of the third partitioning wall of the first housing and being on the same plane as an end surface of an outer periphery of the first housing, a second seal flange surface being formed on an end surface of the fourth partitioning wall and being formed on the same plane as an end surface of an outer periphery of the second housing, and the first housing being joined to the second housing by the first and second seal flange surfaces.

DETAILED DESCRIPTION OF THE PREFERRED EMBODIMENT

Reference will hereinafter be made to the drawings in order to facilitate a better understanding of the present invention.

Figure 1:
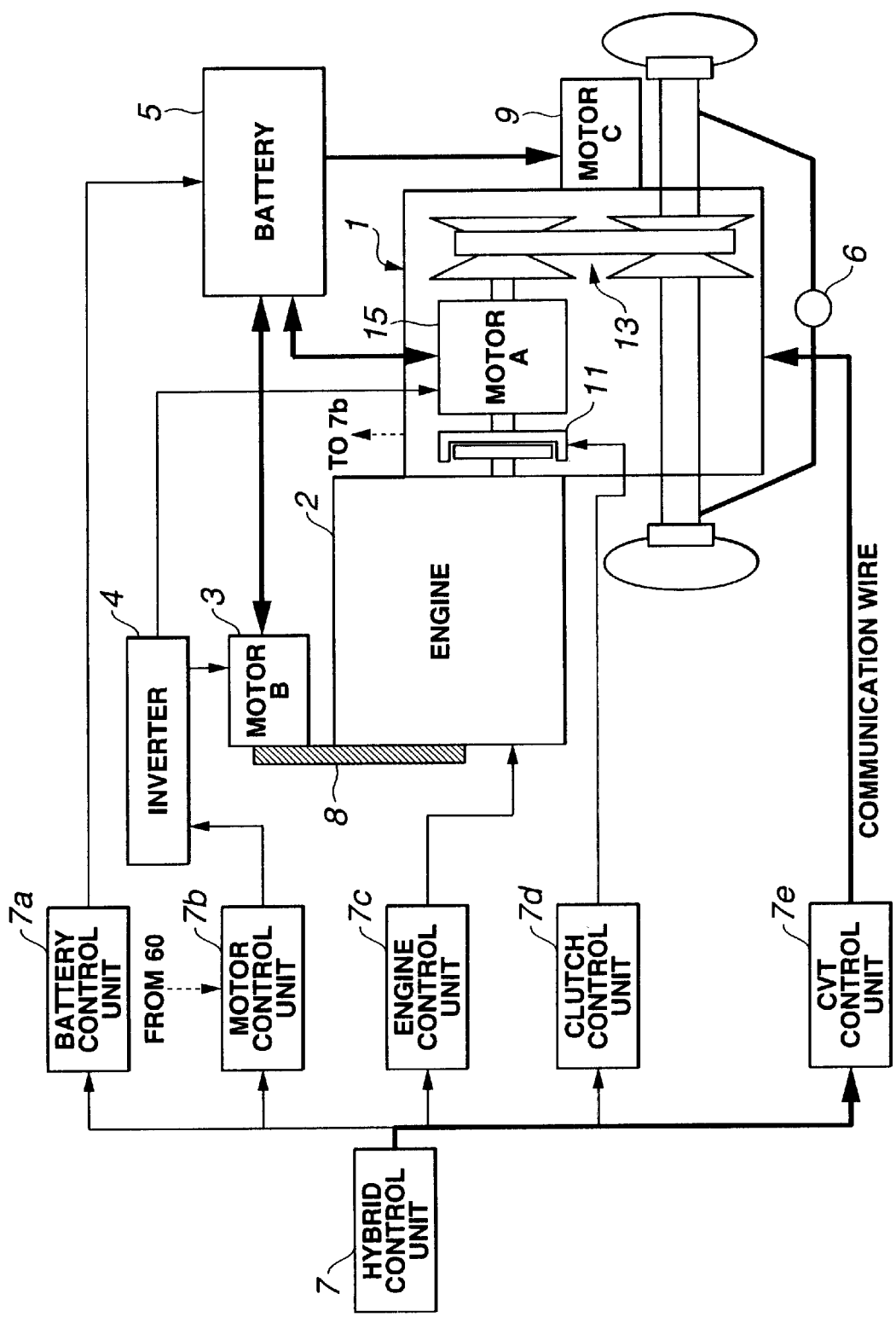
FIG. 1 is a main circuit block diagram of a whole hybrid vehicle to which a transmission unit in a preferred embodiment according to the present invention is applicable.

FIG. 1 shows a circuit block diagram representing a configuration of a hybrid vehicle in a preferred embodiment according to the present invention.

In FIG. 1, reference numeral 1 denotes a transmission unit, reference numeral 2 denotes a motor B for a power regeneration and/or engine start purpose, reference numeral 5 denotes a battery, reference numeral 6 denotes a motor assisted power steering, reference numeral 7 denotes a hybrid control unit, and reference numeral 8 denotes a chain.

An electromagnetic clutch 11, an electric motor A to derive vehicular road wheels, and a continuously variable transmission (hereinafter, referred to as a CVT) 13 are housed within the transmission unit 1. A motor A 15 functions as an energy regeneration motor when the vehicle is decelerated or braked. In addition, a motor C 9 is provided to drive a motor powered hydraulic pump. In the hybrid vehicle in which a running area only by a motor drive is present, a hydraulic pressure during the vehicular run only by the driving force of motor A 15 (especially, a pulley hydraulic pressure of CVT 13) cannot be obtained. In addition, for the same reason, an assistance force of the power steering 6 is motor driven to assist the motor.

The motor B 3 used for power generation/engine start purpose is mounted on an engine block. The engine 2 is connected to motor B via the chain 8. The motor B functions as a generator under a normal condition but functions as a starter when the vehicle is started.

Each control unit 7a controls a charge/discharge operation of the battery 5. The motor control unit 7b a drive of the motor B 3 via an inverter 4. The engine control unit 7c controls an operation of the engine 2. The clutch control unit 7d controls an engagement/disengagement of the electromagnetic clutch 11. The CVT control unit 7e controls generally a variable speed ratio of the CVT via a communication wire.

The hybrid control unit 7 controls integratedly operations of the essential vehicular parts to be controlled by the respective control units 7a through 7e.

Next, an operation of a whole drive system of the hybrid vehicle shown in FIG. 1 will be described below.

The hybrid vehicle shown in FIG. 1 has adopted a parallel run form and the motor A 15 functions as an assistance of the engine 2 whose fuel economy has the precedence over the output torque and power.

The CVT 13 serves as an adjuster for the engine 2 to be driven at an optimum fuel consumption point.

When the electromagnetic clutch 11 is turned off (released), the hybrid vehicle runs only by the drive of the motor A 15.

On and off operations of the electromagnetic clutch 11 are automatically controlled at optimum by the clutch control unit 7d upon receipt of its corresponding command issued from the hybrid control unit 7.

(When the system is activated)

When the engine 2 is started, the motor B 3 functions as the starter to start the engine 2.

(When the vehicle is started and runs at a low vehicular velocity)

When the hybrid vehicle is started under a low load under which a fuel consumption efficiency of the engine 2 is low or runs at a relatively low vehicular velocity, the engine 2 stops so that the vehicle runs only by the motor A 15.

Even if the vehicle is started or runs at the low vehicular velocity, the engine 2 is immediately started in a case where the load is large (large opening angle of an engine throttle valve). The clutch 11 is turned ON so that the drives of the vehicle by both engine 2 and motor A 15 are achieved.

(When the hybrid vehicle runs under a normal condition)

The hybrid vehicle runs mainly by the engine 2 when the vehicle runs at the normal condition, viz., at a steady state. In this case, the variable speed ratio control for the CVT 13 causes an engine speed Ne of the engine 2 to be adjusted so that a drive on a best fuel economy line can be achieved.

(When a high load drive is performed)

When the hybrid vehicle runs at a high load such that the driving force becomes insufficient even if the engine 2 provides a maximum output, electrical energy is positively supplied from the battery 5 to the motor A 15 so that the whole driving force can be augmented.

(When the vehicle is decelerated)

When the vehicle is decelerated, a fuel supply cut-off operation is carried out in the engine 2. At the same time, motor A 15 functions as the generator and part of kinetic energy usually disposed of is converted into the electrical energy. This electrical energy is collected and stored in the battery 5.

(When the vehicle is reversed)

No reverse gear is set in the CVT 13. Hence, during a vehicular reverse operation, the clutch 11 is released and the motor A 15 is reversed so that the vehicle runs only by the drive of the motor A 15.

(When the vehicle stops)

When the hybrid vehicle stops, the engine 2 stops. However, when the charge of the battery 5 is required, an operation of a compressor in an air conditioner is required, or during a warm-up of the engine, the engine 2 does not stop.

Figure 2:
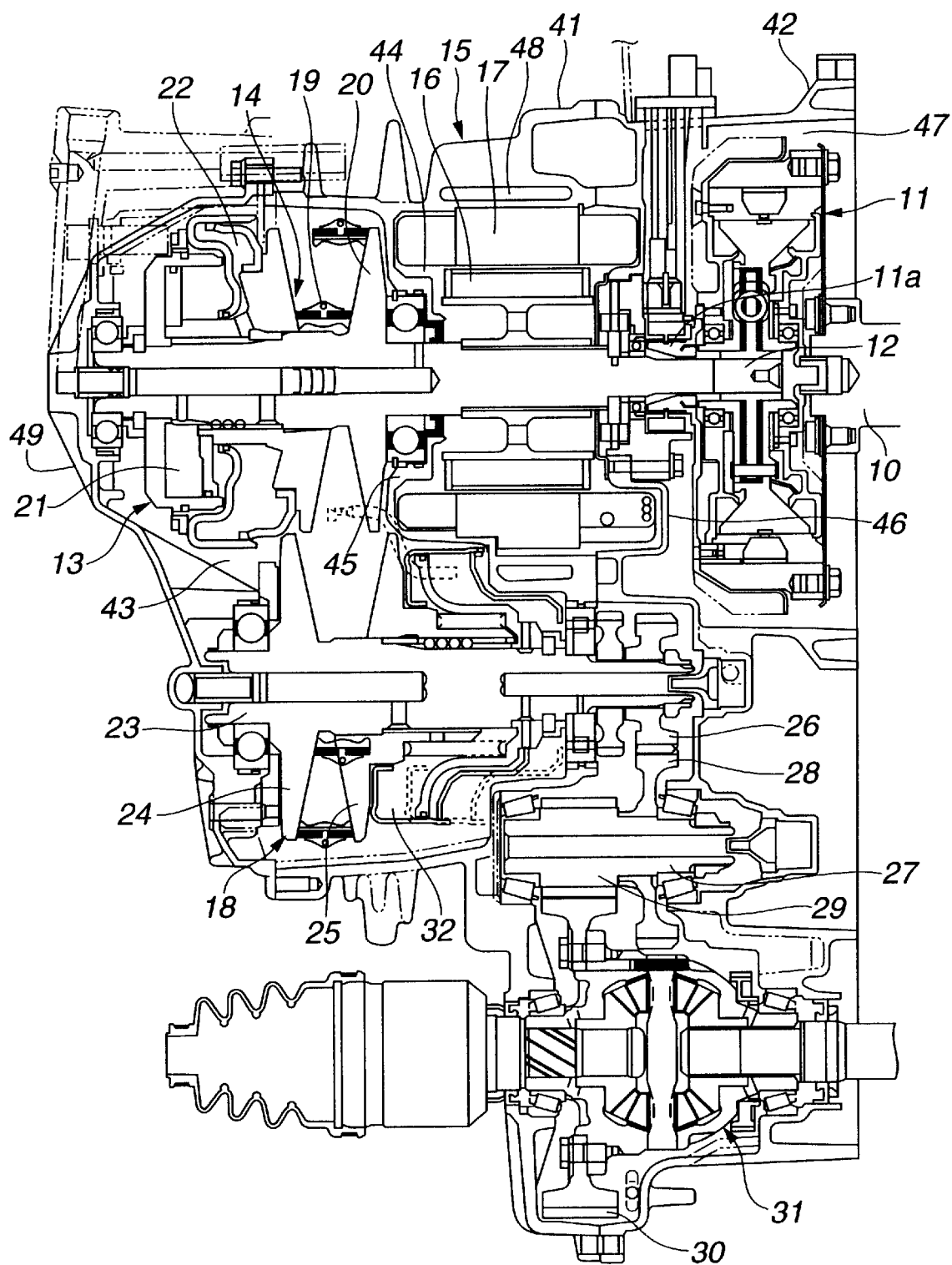
FIG. 2 is a cross sectional view of the transmission unit in the preferred embodiment for the hybrid vehicle having a belt-type continuously variable transmission (CVT).

FIG. 2 shows a cross sectional view of a transmission unit 1 of the hybrid vehicle having the belt type CVT shown in FIG. 1 to which the transmission unit 1 according to the present invention is applicable.

In FIG. 2, an electromagnetic type clutch 11 is linked to an output axle of the engine 2 as a rotary transmission mechanism.

A slip ring 11a through which an electric power is supplied to the electromagnetic clutch 11.

An output axle of the electromagnetic clutch 11 is linked to an input axle 12 of the transmission. A drive pulley 14 for the CVT 13 is disposed on an end of the input axle 12 and the motor A 15 for the normal run vehicular purpose is interposed between the drive pulley 14 and the electromagnetic clutch 11.

A front cover assembly 50 is installed between the motor A 15 and the electromagnetic clutch 11. The front cover assembly 50 includes a resolver 60 which functions as a holder to hold an electrode pole brush 11b through which the power is supplied to the electromagnetic clutch 11 and which detects a position of a rotor 16 of the motor A 15.

The motor A 15 includes: the rotor 16 fixed on the input axle 12; and a stator 17 fixed on the unit housing. Upon receipt of the power supply from the battery 5, the motor A 15 drives the input axle 12 or functions as the generator on the basis of a revolving force (torque) exerted by the input axle 12 during a vehicular deceleration.

The CVT 13 includes the drive pulley 14, driven pulley 18, and a belt 19 to transmit the revolving force of the drive pulley 14 to the driven pulley 18.

The drive pulley 14 includes a stationary truncated cone-shaped plate 20 which is revolved together with the input axle 12 (integrated to the input shaft); and a movable truncated cone-shaped plate 22 which is disposed at an opposite direction to the stationary truncated cone shaped plate 20 to form a letter-V shaped pulley groove and which is movable in an axial direction of the input axle 12 by a hydraulic pressure acted upon a drive pulley cylinder chamber 21.

The driven pulley 18 is disposed on a driven axle 23. The driven pulley 18 includes a stationary truncated cone-shaped plate 24 which revolves together with the driven axle 23; and a movable truncated cone shaped plate 25 which is disposed at an opposite direction to the stationary truncated cone-shaped plate 24 to form a letter-V shaped pulley groove and movable in an axial direction of the driven axle 23 by a hydraulic pressure acted upon a driven pulley cylinder chamber 32 in the axial direction of the driven axle 23.

A drive gear 26 is secured to the driven axle 23. This drive gear 26 is meshed with an idler gear 28 on an idler axle 27. A pinion 29 installed on an idler axle 27 is meshed with a final gear 30. The final gear 30 drives a drive shaft connected to driven road wheels via a differential unit 31.

A revolving force inputted from the engine output axle 10 toward the CVT 13 is transmitted to the differential unit 31 via the drive pulley 14, the belt 19, the driven pulley 18, the driven axle 23, the drive gear 26, the idler axle 27, the pinion 29, and the final gear 30.

During the power transmission described above, the movable truncated cone shaped plate 22 of the drive pulley 14 and that 25 of the driven pulley 18 are moved in their drive and driven axle directions to vary radial portions thereof on which the belt 19 is contacted. Consequently, a revolution ratio between the drive pulley 14 and the driven pulley 18, viz., a speed ratio (so-called, a gear ratio) of the CVT can be varied. Such a control as varying a width of the letter-V shaped pulley groove formed between the drive pulley 14 and the driven pulley 18 is carried out by a hydraulic control from either the drive pulley cylinder chamber 21 or the driven pulley cylinder chamber 32 via the CVT control unit 7e.

Figure 3A:
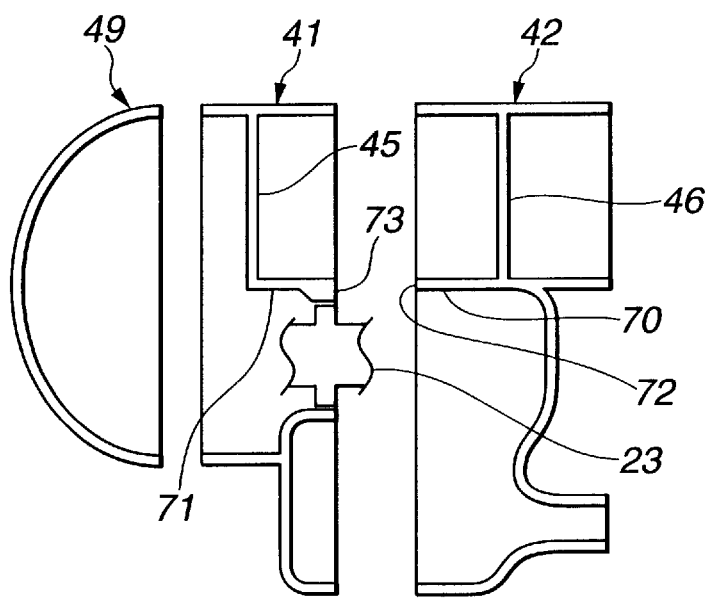
FIGS. 3A and 3B are conceptual views of a housing structure of a transmission unit in the preferred embodiment according to the present invention.
Figure 3B:
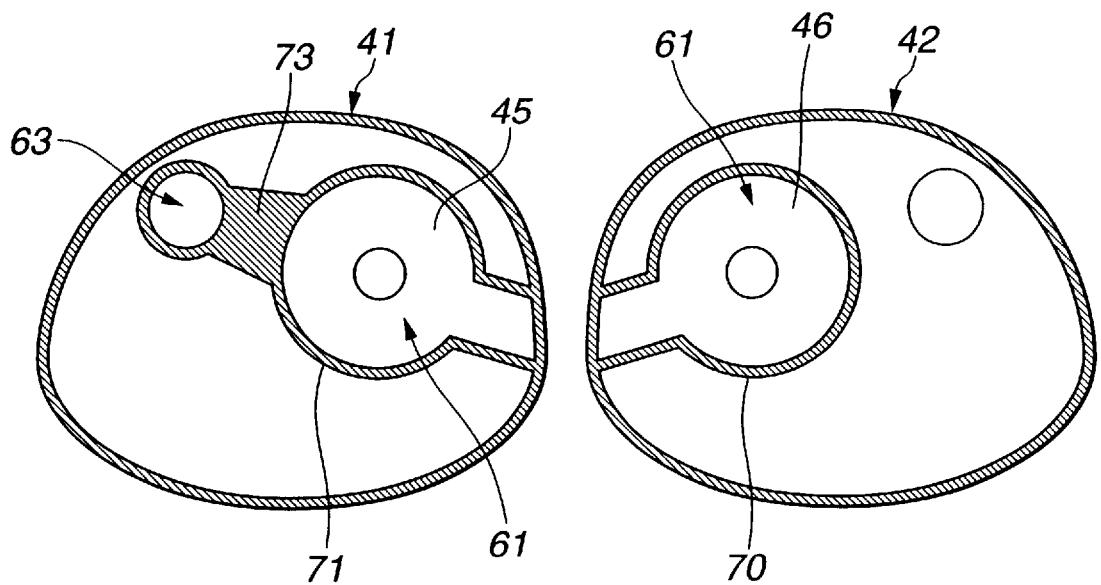

FIGS. 3A and 3B show conceptual views representing a housing structure of the transmission unit 1.

As shown in FIG. 3A, the housing of the transmission unit in which the transmission and the motor are housed includes: a third housing 49 in which the CVT 13 is housed; a second housing 41 in which the CVT 13 and the motor A are housed; and a first housing 42 in which the motor A 15 and electromagnetic clutch 11 are housed. These housings 49, 41, and 42 are axially divided.

The second housing 41 is partitioned into two chambers, viz., the transmission chamber 43 in which the CVT 13 is built via a second partitioning wall 45 and a fourth partitioning wall.

In addition, the second housing 41 includes: a first wet chamber in which both of the drive and driven pulleys of the CVT 13 are housed via a support of the driven axle 23; and a second wet chamber in which both of an idler Axle 27 and the differential 31 are housed.

Figure 4:
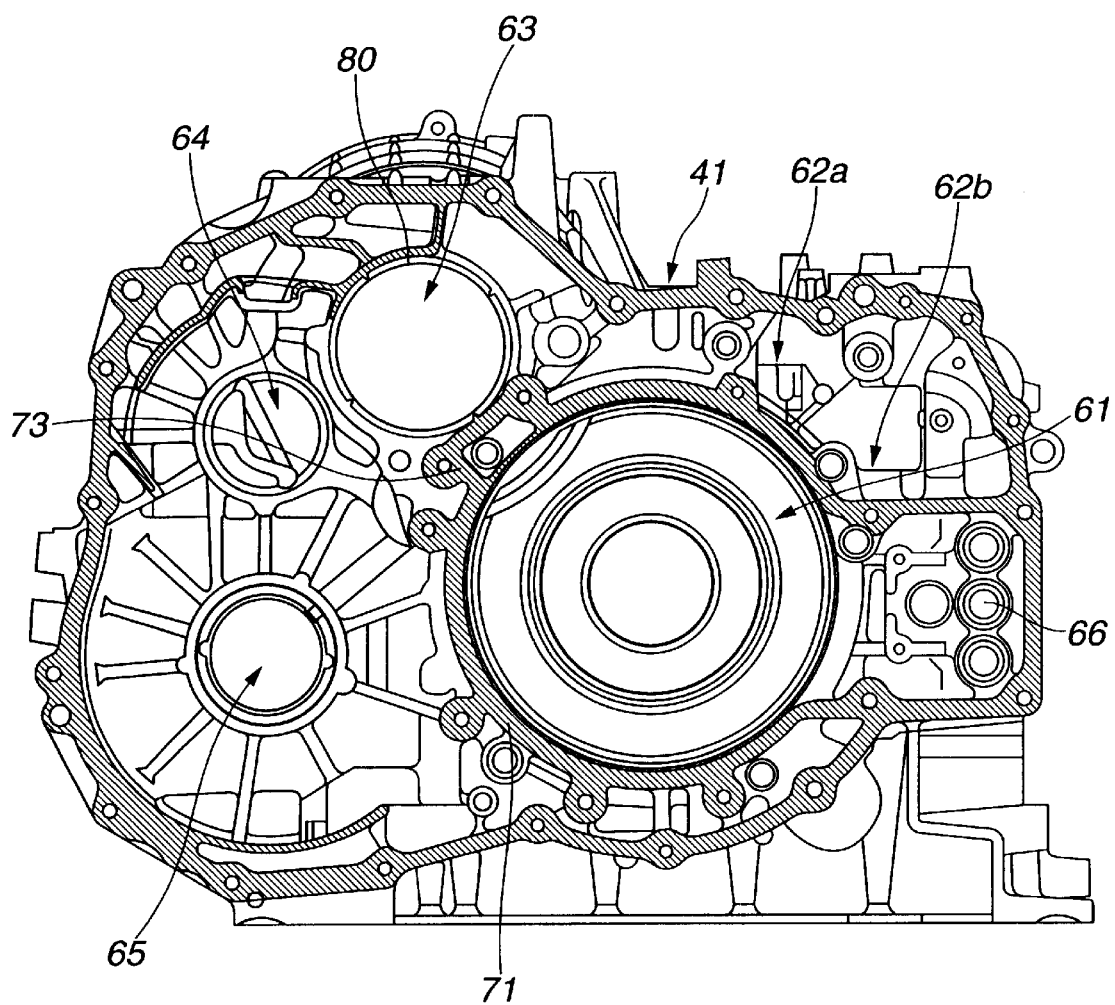
FIG. 4 is a front view of a second housing in housing structure of the transmission unit in the preferred embodiment shown in FIG. 2.

As shown in FIG. 4 which is a front view of the second housing 41, a manual shaft support 62b to operate a parking gear is disposed on a fourth partitioning wall 71 so that the housing structure can be simplified and a degree of freedom in layout within the casing can be improved.

In addition, a third partitioning wall 70 and a fourth partitioning wall 71 define a harness portion 66 (refer to FIG. 4) for a three-phase current supply to the motor A 15. The harness for the three-phase current supply can be wired via the motor chamber 44.

The second housing 42 is formed with the first partitioning wall 46 so that part of a second dry chamber is disposed on one end surface of the second housing to which the second housing 41 is joined and is formed with the third partitioning wall 70 defining a second wet chamber constituted by the driven axle 23, the idler axle 27, and the differential 31 and the motor chamber 44. When each housing 42 and 41 is joined together, the motor chamber 44 is defined between each partitioning wall 45, 46, 70, and 71. When the other end surface of the first housing 42 is connected to the engine 2, the clutch chamber 47 is defined in a space between the first partitioning wall 46 and the engine 2.

Next, a seal flange surface when each housing 41 and 42 is joined together will be described below.

As shown in FIG. 3B, a wall thickness portion 73 is formed between the motor chamber 44 of the second housing 49 and a driven axle housing portion 63 in which the driven axle 23 is housed. An end surface of the wall thickness portion 73 partially forms a seal flange portion. Seal flange surfaces are formed on end surfaces of the third partitioning walls and fourth partitioning walls. These seal flange surfaces are formed on the same plane.

As described above, the seal flange surfaces of the first and second housings 41 and 42 are formed on the same plane. Hence, the motor chamber 44 with an extremely high seal characteristic can be formed. In addition, since the seal flange surface is formed on the same plane, it becomes possible to perform easily a tolerance management on manufacture and a highly accurate flange surface can be formed. In addition, since the motor chamber 44 is constituted by the first housing 42 and the second housing 41, a volume of the motor chamber 44 can sufficiently be assured.

FIG. 4 shows the front view (a surface mating with the first housing 42) of the second housing 41.

The second housing 41 is provided with a motor housing assembly 61, a parking support housing assembly 62b, a driven axle support housing assembly 63, an idler axle housing assembly 64, and a differential housing assembly 65.

It is noted that each hatching region in FIG. 4 indicates the seal flange surface. The definitions of the dry chamber and wet chamber are made with the seal flange surface denoted by the hatched lines.

When the second housing 41 is cast, a sprue (or down gate) is installed on the wall thickness portion 73.

A water jacket 48 to cool the stator 17 of the motor A 15 is installed on an outer periphery of the motor housing assembly 41. An anti-wear sleeve 80 is teemed into the driven wheel housing assembly 63.

As described above, in the case where the anti-wear sleeve 80 to be teemed is placed in the vicinity of the sprue and the second housing 41 having the water jacket is cast, a core molding sand for a water jacket forming is provided. A low pressure Die casting is, hence, adopted. This die casting is such that a high temperature Aluminium is streamed into the sprue and the forming is carried out under a low pressure, a time to retain a high temperature melt Aluminium in a die is long.

Hence, when a thickness of the anti-wear sleeve 80 placed in the vicinity to the sprue is set to be thick and an inner diameter of the sprue is reduced, a thermal capacity can be increased, a failure in melt loss and a failure in tightness can be optimized, and a melt failure rate can be reduced.

Thus, since the wall thickness portion 73 between the motor A 15 of the second housing 42 and the driven axle 23 is formed to be thick, a highly accurate axial hole positioning between the input axle 12 and the driven axle 23 can be maintained.

The transmission housing in which the transmission mechanism described above and the motor A 15 are housed includes: a second housing 41 in which the CVT 13 and motor A 15 are housed; and a first housing 42 in which the electromagnetic clutch 11 is housed. These first and second housings 41 and 42 are divided axially.

The second housing 41 is partitioned into a transmission chamber 43 into which the CVT 13 is incorporated and a motor chamber 44 into which the motor A 15 is incorporated via a second partitioning wall 45.

A first partitioning wall 46 is formed on one end surface on which the second housing 41 is coupled. When each housing 41 and 42 are coupled, the motor chamber 44 is defined between each partitioning wall 45, 46.

When the other end surface of the first housing 42 is coupled to the engine 2, the clutch chamber 47 is defined between the first partitioning wall 46 and the engine 2.

The stator 17 of the motor A 15 is incorporated into the motor chamber 44 by a shrink fitting to simplify the motor distance. On the other hand, a cooling water is circulated into a cooling water jacket 48 formed in the second housing 41 to enclose the stator 17. Thus, an efficient cooling of the motor A 15 can be achieved.

FIG. 3 shows a front view of the front cover assembly 50 to which the present invention is applicable.

FIG. 4 shows a perspective view of the front cover assembly 50 as viewed from the electromagnetic clutch 11.

FIG. 5 shows a rear view of the front cover assembly 50 as viewed from the motor A 15.

FIG. 6 shows a perspective view of the front cover assembly as viewed from the motor A 15.

The detailed structure of the front cover assembly 50 will be described below.

The detailed structure of the front cover assembly 50 will be described below.

Within the front cover 51, a holder 52 to hold the electrode brush 11b and a resolver 60 to detect the revolution position of the rotor 16 are installed. A signal from this resolver 60 is supplied to the control unit 7b (not shown in FIGS. 3 through 6) via a harness. In addition, a harness holder 55 is disposed to hold the harness.

The front cover 51 includes: front cover convex portions 51b each of which serves as a bolt pedestal to attach the front cover 51 onto the first partitioning wall 4b; and a front cover recess portion 51e. In addition, a pedestal 80 to hold a resolver stator 61 is integrally formed on a motor chamber 44 of the front cover 51. The pedestal 80 includes a pedestal convex 80a and a pedestal recess 80b. The pedestal convex 80a serves as an attaching portion to attach the resolver stator 61 by a bolt. The pedestal recess 80b is so constructed as to secure a plane of the front cover attaching portion 51d to attach the front cover 51 onto the first partitioning wall convex 46a.

The resolver stator 61 is formed with a stator convex portion 61a coupled to the front cover 51 and a stator recess portion 61b to secure the plane of the front cover attaching portion 51. In addition, a resolver rotor 62 is attached to overlap the resolver rotor 61 is so structured as to be integrally revolved with the input axle 12.

A first partitioning wall convex 46a and first partitioning recess 46b are attached onto a supporting portion of the first partitioning wall 46 for the front cover 51. The first partitioning wall convex 46a is coupled to the front cover attaching portion 51d by a bolt.

A magnetic field shield plate 53 to shield a variation in a magnetic field developed by the motor 15A is disposed in a motor chamber 44 of the front cover assembly 50. A metal gasket 54 is interposed between the front cover 51 and first partitioning wall 46. The metal gasket 54 serves to prevent splashing matters such as slurry and oil invaded into the clutch chamber 47 and electrode brush abrasion powders developed from a slide surface of the electrode brush 11b and a slip ring 11a from being invaded into the motor chamber 44.

FIG. 7 shows a cross sectional view of the front convex assembly cut away along a line A-A in FIG. 3.

As shown in FIG. 7, the front cover 51 is fixed onto the first partitioning wall 46 by the bolt 51c. This bolt 51c is inserted in a bolt hole 51c disposed on the front cover convex portion 51b.

In addition, the front cover convex portion 51b is installed so as to be the same plane as a part of the first partitioning wall 46 in which the stator is housed. Consequently, the front cover 51 can easily be assembled without interference of some tool against the first partitioning wall 46 so that an operability of the whole front cover assembly can be improved.

Furthermore, the bolt hole 51a of the front cover 51 is elongated and an assembly angle for the front cover 51 is adjustable over a range in which the bolt hole 51a is provided as appreciated from FIG. 3.

This permits the position of the resolver stator 61 to be adjusted even after the front cover 15 is assembled. In addition, the attaching portion of the front cover attaching portion attaching portion 51d and the first partitioning wall convex portion 46a and the stator recess portion 61a are coupled.

The front cover recess portion 51e, the pedestal convex portion 80a, the stator convex portion 61a, and the first partitioning wall recess portion 46b are constituted. Thus, the resolver stator 61 and the front cover 51 are overlapped axially. Thus, both the resolver 61 and the front cover 51 can be attached onto the first partitioning wall 46 without increase in the axial direction.

FIG. 8 shows a cross sectional view cut away along a line B-B of the front cover assembly 50.

As shown in FIG. 8, a harness holder 55 to hold a harness via which a signal of the resolver stator 61 is supplied to the control unit 7e in FIG. 1.

In this cross sectional view, the pedestal convex portion 80a, the stator convex portion 61a, and the first partitioning recess portion 46b are coupled.

FIG. 9 shows a cross sectional view of the front cover assembly 50 cut away along a line C-C.

As shown in FIG. 9, the resolver stator 61 is fixed by a front cover 51.

In addition, the magnetic shield plate 53 is fixed onto the first partitioning wall 46 by a bolt. In this cross section, the pedestal convex portion 80a, the stator convex portion 61a, and the first partitioning wall recess portion 46b are coupled together.

As described above, in the transmission unit of the hybrid vehicle in the preferred embodiment, the resolver 60 is disposed in an inner part of the stator 17 of the motor A 15. Consequently, since the stator 17 is overlapped in an axial direction, the increase in the axial length will not be introduced. Hence, the whole structure can be compacted.

The magnetic shield plate 53 is interposed between the motor A 15 and the resolver 60.

That is to say, since the resolver 60 receives an influence of the magnetic field, it is susceptible to a variation of the magnetic field developed in the motor A 15. However, the magnetic field developed in the motor A 15. However, the magnetic field shielded plate 53 can prevent the influence of the magnetic field from occurring so that the resolver 60 can be disposed at a position adjacent to the motor A 15.

In addition, a unit housing of the transmission unit 1, a clutch chamber 47 to house an electromagnetic clutch 11, a motor chamber 44 to house the motor A 15; and a transmission hydraulic chamber 43 to house the CVT 13 as a hydraulic chamber.

The resolver 60 includes a resolver rotor 62 which revolves together with the input axle 12 and the resolver stator 61 fixed on the front cover 51. The front cover 51 is attached onto the first partitioning wall 46 so as to enable a relative revolution in a rotation direction within a predetermined angle. The first partitioning wall 46 defines the clutch chamber 47 and the motor chamber 44.

That is to say, since the resolver stator 61 is disposed on the first partitioning wall 46 to define the clutch chamber 47 and motor chamber 44, the adjustment for the position of the resolver 60 can be made after the assembly thereof.

A metal gasket 54 is disposed between the front cover 51 and the fist partitioning wall 46. That is to say, in a case where a slurry or oil is invaded in the clutch chamber, such a slurry or oil from a splash due to the rotation of the electromagnetic clutch 11 so that the splash is dispersed. At this time, the metal gasket 54 is installed between the front cover 51 and the first partitioning wall 46 so that an invasion of the splash into the motor chamber 44 can be prevented.

A holder 52 of an electrode brush 11b via which the powder is supplied to the electromagnetic clutch 11 which engages and disengages to and from the engine output axle 10 and input axle 12 is disposed on the front cover 51.

Hence, it is not necessary to additionally construct the holder 52 of the electrode brush 11b and the number of parts on the front cover 51 can, thus, be reduced The front cover 51, the attachment portion of the first cover 51 are alternatingly disposed with the same peripheral surface divided so as to be overlapped in the axial direction. That is to say, in a case where no division on the same peripheral surface is carried out, the resolver stator 61 is attached on the front cover 51 and both front cover 51 and the attaching portion of the first partitioning wall 46 need to be disposed on the further outer periphery of the attachment portion. However, with the pedestal 80 to holed the revolver stator 61 on the front cover 1 integrally disposed, the pedestal convex portion 80a and the pedestal recess portion 80b are formed on the pedestal 80 to divide the same peripheral surface.

It becomes possible to overlap both attaching portions by disposing both attaching portion 80a on the resolver stator 61 and the attaching portion 51d on the first partitioning wall 46. Consequently, the revolver 60 can be positioned in the front cover 51 without increase in the axial direction.

As described above, in the transmission unit for the hybrid vehicle in the preferred embodiment according to the present invention, the electromagnetic clutch 11, the motor A, and the CVT 13 are arranged sequentially (serially) in this order on the input axle 12 and the driven axle 23 is arranged in parallel to at least the motor A 15 with an overlap on the motor A 15.

The housing of the transmission unit 1 is constituted by the first housing 42, the second housing 41, and the third housing 49.

The first housing 42 is provided with the first partitioning wall 46 to define the clutch chamber 47 in which the electromagnetic clutch 11 is housed and the motor chamber 44 in which the motor A 15 is housed and the third partitioning wall 70 to define the clutch chamber 47 and the wet chamber in which the motor chamber 44 and the driven axle 23 are housed.

Then, the second housing 41 is provided with the second partitioning wall 45 to define the motor chamber 44 and the first wet chamber in the axial direction of the input axle 23 and the fourth partitioning wall 71 to define the motor chamber 44 and the first wet chamber in the radial direction.

The first seal flange surface formed on the end surface of the third partitioning wall 70 is on the same plane as the end surface on the outer periphery of the first housing 42. The second seal flange surface formed on the end surface of the fourth partitioning wall 71 is on the same plane as the end surface of the outer periphery of the housing of the second housing 41. Both of the first housing 42 and the second housing 41 are tightly joined together through the first and second seal flange surfaces.

That is to say, in the transmission unit for the hybrid vehicle, both of the electromagnetic chamber and motor chamber need to be constituted by the respective dry chambers.

Therefore, since the motor chamber 44 is defined by the first housing 42 and the second housing 41, easiness in the assembly of the motor A 15 can be improved and the space for the motor chamber 44 can widely be secured.

In addition, since the wet chamber which indicates the oil chamber is formed on the same plane, it is necessary to positively seal the motor chamber 44 against the wet chamber. However, the motor chamber 44 is joined through the first and second seal flange surfaces so that the positively sealed dry chamber can be formed.

In addition, since the seal flange surfaces are formed on the same plane, it becomes possible to facilitate the tolerance management on the manufacture of the housing.

Consequently, the highly accurate seal flange surfaces can be formed.

In addition, the wall thickness portion 73 constituting the fourth partitioning wall 71 and defined between the motor A 15 and the driven axle 23 is formed to be thick.

Hence, even if a large torque or load is imposed on the input axle 12 and/or the driven axle 23, the axial hole positioning of the input axle 12 and/or the driven axle 23 can accurately be maintained.

It is noted that reference numeral 72 shown in FIG. 3A denotes the first seal flange surface formed on the end surface of the third partitioning wall 70 of the first housing.

The entire contents of Japanese Patent Applications No. 2000-079548 filed in Japan on Mar. 22, 2000 are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A hybrid vehicle comprising:
   an engine;
   a clutch;
   a motor ;
   a transmission comprising an input axle that is disengageably engaged to the engine by the clutch and on which the engine, the clutch, and the motor are serially arranged and an output axle which is arranged in parallel to at least the motor; and
   a unit housing of the transmission comprising at least a first housing and a second housing, the first housing comprising: a first partitioning wall elongated in a radial direction of the transmission to define a first dry chamber and a second dry chamber, both of the first and second chambers inhibiting an entrance of a lubricating oil; and a third partitioning wall elongated in an axial direction of the transmission to define the first and second dry chambers together with the first partitioning wall and to define a second wet chamber allowing the entrance of the lubricating oil, the second housing comprising: a second partitioning wall elongated in the radial direction thereof to define a first wet chamber allowing the entrance of the lubricating oil; and a fourth partitioning wall elongated in the axial direction to define the second dry chamber and the second wet chamber together with the second partitioning wall, a first seal flange surface being formed on an end surface of the third partitioning wall of the first housing and being on the same plane as an end surface of an outer periphery of the first housing, a second seal flange surface being formed on an end surface of the fourth partitioning wall and being formed on the same plane as an end surface of an outer periphery of the second housing, and the first housing being joined to the second housing by the first and second seal flange surfaces.

2. A hybrid vehicle as claimed in claim 1, wherein the clutch comprises an electromagnetic clutch which is housed in the first dry chamber and the motor comprises an electric motor which is housed in the second dry chamber.

3. A hybrid vehicle as claimed in claim 1, wherein the output axle of the transmission, an idler axle, and a differential are housed in the second wet chamber and the transmission is housed in the first wet chamber.

4. A hybrid vehicle as claimed in claim 1, wherein the transmission comprises a continuously variable transmission and the unit housing further comprises a third housing in which the continuously variable transmission is housed, an end surface of an outer periphery of the third housing being joined to the second housing.

5. A hybrid vehicle as claimed in claim 1, wherein a wall thickness portion is formed on the end surface of the fourth partitioning wall on which the second seal flange surface is formed to support the output axle of the transmission and the motor with a predetermined high rigidity.

\* \* \* \* \*